(12) United States Patent
Wersing et al.

(10) Patent No.: US 7,308,134 B2
(45) Date of Patent: Dec. 11, 2007

(54) PATTERN RECOGNITION WITH HIERARCHICAL NETWORKS

(75) Inventors: Heiko Wersing, Frankfurt am Main (DE); Edgar Körner, Seligenstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 698 days.

(21) Appl. No.: 10/155,948

(22) Filed: May 24, 2002

(65) Prior Publication Data

US 2003/0002731 A1 Jan. 2, 2003

(30) Foreign Application Priority Data

May 28, 2001 (EP) .................................. 01113014

(51) Int. Cl.
G06K 9/62 (2006.01)
G06K 9/74 (2006.01)
G05B 13/02 (2006.01)

(52) U.S. Cl. ...................... 382/161; 382/160; 382/228; 700/47

(58) Field of Classification Search ...................... None
See application file for complete search history.

(56) References Cited

U.S. PATENT DOCUMENTS

| | | | | |
|---|---|---|---|---|
| 5,058,179 A | * | 10/1991 | Denker et al. | 382/158 |
| 5,067,164 A | * | 11/1991 | Denker et al. | 382/158 |
| 5,293,456 A | * | 3/1994 | Guez et al. | 706/20 |
| 5,422,981 A | * | 6/1995 | Niki | 706/20 |
| 5,497,430 A | * | 3/1996 | Sadovnik et al. | 382/156 |
| 5,500,905 A | * | 3/1996 | Martin et al. | 382/157 |
| 5,774,586 A | * | 6/1998 | LeCun | 382/215 |
| 5,822,742 A | * | 10/1998 | Alkon et al. | 706/31 |
| 5,995,644 A | * | 11/1999 | Lai et al. | 382/131 |
| 6,038,337 A | * | 3/2000 | Lawrence et al. | 382/156 |
| 6,105,015 A | * | 8/2000 | Nguyen et al. | 706/26 |
| 6,278,799 B1 | * | 8/2001 | Hoffman | 382/159 |
| 6,728,642 B2 | * | 4/2004 | Bloch et al. | 702/20 |

(Continued)

OTHER PUBLICATIONS

Lecun Y., Bottou L., Bengio Y. and Haffner P., "Gradient Based Learning Applied to Document Recognition" The Proceedings of IEEE, vol. 86 No. 11, Nov. 1998, pp. 2278-2324.*

(Continued)

*Primary Examiner*—Bhavesh M Mehta
*Assistant Examiner*—Charles Kim
(74) *Attorney, Agent, or Firm*—Fenwick & West LLP (57) ABSTRACT

Within the frameworks of hierarchical neural feed-forward architectures for performing real-world 3D invariant object recognition a technique is proposed that shares components like weight-sharing (2), and pooling stages (3, 5) with earlier approaches, but focuses on new methods for determining optimal feature-detecting units in intermediate stages (4) of the hierarchical network. A new approach for training the hierarchical network is proposed which uses statistical means for (incrementally) learning new feature detection stages and significantly reduces the training effort for complex pattern recognition tasks, compared to the prior art. The incremental learning is based on detecting increasingly statistically independent features in higher stages of the processing hierarchy. Since this learning is unsupervised, no teacher signal is necessary and the recognition architecture can be pre-structured for a certain recognition scenario. Only a final classification step must be trained with supervised learning, which reduces significantly the effort for adaptation to a recognition task.

22 Claims, 2 Drawing Sheets

U.S. PATENT DOCUMENTS

2003/0059106 A1* 3/2003 Gutta .................. 382/158

OTHER PUBLICATIONS

Lee T., Lewicki M. and Sejnowski T., "ICA Mixture Models for Unsupervised Classification of Non-Gaussin Classes and Automatic Context Switchong in Blind Signal Separation" IEEE PAMI, vol. 22 No. 10, Oct. 2000, pp. 1078-1089.*

Wallis G., "Using Spatio-temporal Correlations to Learn Invariant Objects Recognition" Neural Networks, vol. 9 No. 9, 1996, pp. 1513-1519.*

Becker et al., "Unsupervised Neural Network Learning Procedures for Feature Extraction and Classification", Applied Intellegence 6, 185-203, 1996.*

Jain et al., "Statistical Pattern Recognition: A Review", IEEE Trans. on Pattern Recognition and Machine Intelligence, vol. 22, No. 1, Jan. 2000, 4-37.*

"Viewpoint invariant face recognition using independent component analysis and attractor networks" by Bartlett et al. Bartlett, M. and Sejnowski, T. J. 1997. Viewpoint invariant face recognition using independent component analysis and attractor networks. In Advances in Neural Information Processing Systems 9, 817-823.*

Bartlett M.S. et al.; "*Learning Viewpoint-Invariant Face Representations From Visual Experience In An Attractor Network*"; Network: Computer Neural Systems, IOP Publishing, Bristol, GB, vol. 9, No. 3, Aug. 1, 1998, pp. 399-417, XP000783461.

Romero R.D. et al.; "*Optical Chinese Character Recognition Using Probabilistic Neural Networks*", Pattern Recognition, Pergamon Press Inc., Elmsford, N.Y., US, vol. 30, No. 8, Aug. 1, 1997, pp. 1279-1292, XP004074588.

Dailey M.N. et al.; "*Organization Of Face And Object Recognition In Modular Neural Network Models*"; Neural Networks, Elsevier Science Publishers, Barking, GB, vol. 12, No. 7-8, Oct. 1999, pp. 1053-1074, XP004180497.

Lee T-W. et al.; "*ICA Mixture Models For Unsupervised Classification Of Non-Gaussian Classes And Automatic Context Switching In Blind Signal Separation*"; IEEE Transactions on Pattern Analysis And Machine Intelligence, IEEE Inc. New York, US, vol. 22, No. 10, Oct. 2000, pp. 1078-1089, XP000976544.

Abramowicz H. et al.; "*An Orientation Selective Neural Network And Its Application To Cosmic Muon Identification*"; Nuclear Instruments & Methods In Physics Research, Section—A: Accelerators, Spectrometers, Detectors And Associated Equipment, North-Holland Publishing Company; Amsterdam, NL, vol. 378, No. 1, Aug. 11, 1996, pp. 305-311, XP004011429.

Wallis G.; "*Using Spatio-Temporal Correlations To Learn Invariant Object Recognition*"; Neural Networks, Elsevier Science Publishers, Barking, GB, vol. 9, No. 9, Dec. 1, 1996, pp. 1513-1519, XP004096094.

European Search Report, EP 01113014, Apr. 15, 2002, 5 pages.

* cited by examiner

PATTERN RECOGNITION WITH HIERARCHICAL NETWORKS

CROSS-REFERENCE TO RELATED APPLICATIONS

This application is related to and claims priority from European Patent Application No. 01 113 014.3 filed on May 28, 2001.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The present invention relates to a method for recognizing a pattern having a set of features, a method for training a hierarchical network, a computer software program for implementing such a method, a pattern recognition apparatus with a hierarchical network, and the use of a pattern recognition apparatus.

The present invention finds application in the field of pattern recognition, wherein the pattern can be represented in an optical, acoustical or any other digitally representable manner.

BACKGROUND OF THE INVENTION

At first the background of the processing architecture will be explained. The concept of convergent hierarchical coding assumes that sensory processing in the brain can be organized in hierarchical stages, where each stage performs specialized, parallel operations that depend on input from earlier stages. The convergent hierarchical processing scheme can be employed to form neural representations which capture increasingly complex feature combinations, up to the so-called "grandmother cell", that may fire only if a specific object is being recognized, perhaps even under specific viewing conditions. The main criticism against this type of hierarchical coding is that it may lead to a combinatorial explosion of the possibilities which must be represented, due to the large number of combinations of features which constitute a particular object under different viewing conditions (von der Malsburg, C. (1999), "The what and why of binding: The modeler's perspective", Neuron, 24, 95-104).

In the recent years several authors have suggested approaches to avoid such a combinatorial explosion for achieving invariant recognition. The main idea is to use intermediate stages in a hierarchical network to achieve higher degrees of invariance over responses that correspond to the same object, thus reducing the combinatorial complexity effectively.

Since the work of Fukushima, who proposed the Neocognitron as an early model of translation invariant recognition, two major processing modes in the hierarchy have been emphasized: Feature-selective neurons are sensitive to particular features which are usually local in nature. Pooling neurons perform a spatial integration over feature-selective neurons which are successively activated, if an invariance transformation is applied to the stimulus. As was recently emphasized by Mel, B. W. & Fiser, J. (2000), "Minimizing binding errors using learned conjunctive features", Neural computation 12(4), 731-762, the combined stages of local feature detection and spatial pooling face what could be called a stability-selectivity dilemma. On the one hand excessive spatial pooling leads to complex feature detectors with a very stable response under image transformations. On the other hand, the selectivity of the detector is largely reduced, since wide-ranged spatial pooling may accumulate too many weak evidences, increasing the chance of accidental appearance of the feature.

Despite its conceptual attractivity and neurobiological evidence, the plausibility of the concept of hierarchical feed-forward recognition stands or falls by the successful application to sufficiently difficult real-world 3D invariant recognition problems. The central problem is the formulation of a feasible learning approach for optimizing the combined feature-detecting and pooling stages. Apart from promising results on artificial data and very successful applications in the realm of hand-written character recognition, applications to 3D recognition problems (Lawrence, S., Giles, C. L., Tsoi, A. C., & Back, A. D. (1997), "Face recognition: A convolutional neural-network, approach", IEEE Transactions on Neural Networks 8(1), 98-113) are exceptional. One reason is that the processing of real-world images requires network sizes that usually make the application of standard supervised learning methods like error backpropagation infeasible. The processing stages in the hierarchy may also contain network nonlinearities like Winner-Take-All, which do not allow similar gradient-descent optimization. Of great importance for the processing inside a hierarchical network is the coding strategy employed. An important principle is redundancy reduction, that is a transformation of the input which reduces the statistical dependencies among elements of the input stream. Wavelet-like features have been derived which resemble the receptive fields of V1 cells either by imposing sparse overcomplete representations (Olshausen, B. A. & Field, D. J. (1997), "Sparse coding with an overcomplete basis set: A strategy employed in V1", Vision Research, 37, 3311-3325) or imposing statistical independence as in independent component analysis (Bell, A. J. & Sejnowski, T. J. (1997), "The 'independent components' of natural scenes are edge filters", Vision Research, 37, 3327-3338). These cells perform the initial visual processing and are thus attributed to the initial stages in hierarchical processing.

Apart from understanding biological vision, these functional principles are also of great relevance for the field of technical computer vision. Although ICA (Independent Component Analysis) has been discussed for feature detection in vision by several authors, there are only few references for its usefulness in invariant object recognition applications. Bartlett, M. S. & Sejnowski, T. J. (1997), "Viewpoint invariant face recognition using independent component analysis and attractor networks", In M. C. Mozer, M. I. Jordan, & T. Petsche (Eds.), "Advances in Neural Information Processing Systems", Volume 9, pp. 817, The MIT Press, showed that for face recognition ICA representations have advantages over PCA (Principal Component Analysis)-based representations with regard to pose invariance and classification performance.

Now the use of hierarchical networks for pattern recognition will be explained.

An essential problem for the application to recognition tasks is which coding principles are used for the transformation of information in the hierarchy and which local feature representation is optimal for representing objects under invariance. Both properties are not independent and must cooperate to reach the desired goal. In spite of its conceptual attractivity, learning in deep hierarchical networks still faces some major drawbacks. The following review will discuss the problems for the major approaches, which were considered so far.

Fukushima, K. (1980), "Neocognitron: A self-organizing neural network model for a mechanism of pattern recognition unaffected by shift in position", Biol. Cyb., 39, 139-202, introduced with the Neocognitron a principle of hierarchical processing for invariant recognition, that is based on successive stages of local template matching and spatial pooling. The Neocognitron can be trained by unsupervised, competitive learning, however, applications like hand-written digit recognition have required a supervised manual training procedure. A certain disadvantage is the critical dependence of the performance on the appropriate manual training pattern selection (Lovell, D., Downs, T., & Tsoi, A. (1997), "An evaluation of the neocognitron", IEEE Trans. Neur. Netw., 8, 1090-1105) for the template matching stages. The necessity of teacher intervention during the learning stages has so far made the training infeasible for more complex recognition scenarios like 3D object recognition.

Riesenhuber, M. & Poggio, T. (1999), "Are cortical models really bound by the "binding problem"?", Neuron, 24, 87-93, emphasized the point that hierarchical networks with appropriate pooling operations may avoid the combinatorial explosion of combination cells. They proposed a hierarchical model with similar matching and pooling stages as in the Neocognitron. A main difference are the nonlinearities which influence the transmission of feedforward information through the network. To reduce the superposition problem, in their model a complex cell focuses on the input of the presynaptic cell providing the largest input. The model has been applied to the recognition of artificial paper clip images and computer-rendered animal and car objects (Riesenhuber, M. & Poggio, T. (1999b), "Hierarchical models of object recognition in cortex", Nature Neuroscience 2(11), 1019-1025) and uses a local enumeration scheme for defining intermediate combination features.

From Y. Le Cun et al ("Hand-written digit recognition with back-propagation network", 1990, in advances in neural information processing systems 2, pp. 396-404) a multi-layer network is known. An input image is scanned with a single neuron that has a local receptive field, and the states of this neuron are stored in corresponding locations in a layer called a feature map. This operation is equivalent to a convolution with a small size kernel. The process can be performed in parallel by implementing the feature map as a plane of neurons whose weights vectors are constrained to be equal. That is, units in a feature map are constrained to perform the same operation on different parts of the image. In addition, a certain level of shift invariance is present in the system as shifting the input will shift the result on the feature map, but will leave it unchanged otherwise. Furthermore it is proposed to have multiple feature maps extracting different features from the same image. According to this state of the art the idea of local, convolutional feature maps can be applied to subsequent hidden layers as well, to extract features of increasing complexity and abstraction. Multi-layered convolutional networks have been widely applied to pattern recognition tasks, with a focus on optical character recognition, (see LeCun, Y., Bottou, L., Bengio, Y., & Haffner, P. (1998), "Gradient-based learning applied to document recognition", Proceedings of the IEEE, 86, 2278-2324 for a comprehensive review). Learning of optimal features is carried out using the backpropagation algorithm, where constraints of translation invariance are explicitly imposed by weight sharing. Due to the deep hierarchies, however, the gradient learning takes considerable training time for large training ensembles and network sizes. Lawrence, S., Giles, C. L., Tsoi, A. C., & Back, A. D. (1997), "Face recognition: A convolutional neural-network approach", IEEE Transactions on Neural Networks 8(1), 98-113 have applied the method augmented with a prior vector quantization based on self-organizing maps for dimensionality reduction and reported improved performance for a face classification setup.

Now applications of hierarchical models on the invariant recognition of objects will be shortly explained.

U.S. Pat. No. 5,058,179 relates to a hierarchy constrained automatic learning network for character recognition. Highly accurate, reliable optical character recognition thereby is afforded by the hierarchically layered network having several layers of several constrained feature detection for localized feature extraction followed by several fully connected layers for dimensionality reduction. The character classification is performed in the ultimate fully connected layer. Each layer of parallel constrained feature detection comprises a plurality of constrained feature maps and a corresponding plurality of kernels wherein a predetermined kernel is directly related to a single constrained feature map. Undersampling can be performed from layer to layer.

U.S. Pat. No. 5,067,164 also discloses a hierarchical constrained automatic learning neural network for recognition having several layers of constrained feature detection wherein each layer of constrained feature detection includes a plurality of constrained feature maps and a corresponding plurality of feature reduction maps. Each feature reduction map is connected to only one constrained feature map in the layer for undersampling that constrained feature map. Units in each constrained feature map of the first constrained feature detection layer respond as a function of a corresponding kernel and of different portions of the pixel image of the character captured in a receptive field associated with the unit. Units in each feature map of the second constrained feature detection layer respond as a function of a corresponding kernel and of different portions of an individual feature reduction map or a combination of several feature reduction maps in the first constrained feature detection layer as captured in a receptive field of the unit. The feature reduction maps of the second constrained feature detection layer are fully connected to each unit of the final character classification layer. Kernels are automatically learned by the error backpropagation algorithm during network initialization or training. One problem of this approach is that learning must be done for all kernels simultaneously in the hierarchy, which makes learning too slow for large networks. This has so far precluded the application of this kind of convolutional networks to more difficult problems of three-dimensional invariant object recognition.

U.S. Pat. No. 6,038,337 discloses a method and an apparatus for object recognition using a hybrid neural network system exhibiting a local image sampling, a self-organizing map neural network for dimension reduction and a hybrid convolutional network. The hybrid convolutional neural network provides for partial invariance to translation, rotation, scale and deformation. The hybrid convolutional network extracts successively larger features in a hierarchical set of layers. As an example application face recognition of frontal views is given.

BRIEF SUMMARY OF THE INVENTION

In view of the above prior art the object of the present invention is to improve the coding efficiency and to reduce the learning constraints in large scale hierarchical convolutional networks.

The basic concept to achieve this object is a new approach for training the hierarchical network which uses statistical means for (incrementally) learning new feature detection stages. As a practical matter the improvement should be such that not only two dimensionally objects, but also three dimensional objects with variations of three dimensional rotation, size and lightning conditions can be recognized. As another advantage this learning method is viable for arbitrary nonlinearities between stages in the hierarchical convolutional networks. In contrast thereto the technology according to the abovementioned prior art can only perform backpropagation learning for differentiable nonlinearities which poses certain restrictions on the network design.

The object is achieved by means of the features of the independent claims. The dependent claims develop further the central idea of the present invention.

According to the present invention therefore a method for recognizing a pattern having a set of features is proposed. At first a plurality of fixed feature detectors are convolved with a local window scanned over a representation of a pattern to be detected to generate a plurality of feature maps. Then an arbitrary nonlinearity is applied to each feature map separately. Local combinations of features of the feature maps are sensed. Finally, the pattern is classified (and thus recognized) on the basis of the sensed local combinations. According to the present invention for the local combination of features (corresponding to an intermediate layer of a network) statistically independent features are pre-set.

The statistically independent features can be pre-determined by means of an independent component analysis (ICA) of convolutions of training patterns. Independent Component Analysis resides in the construction of new features which are the independent components of a data set. The independent components are random variables of minimum mutual information constructed from linear combinations of the input features. It is a fact of information theory that such variables will be as independent as possible.

Alternatively or additionally the statistically independent features can be pre-determined by means of a principal component analysis (PCA) of convolutions of training patterns. Principal component analysis resides in the construction of new features which are the principal components of a data set. The principal components are random variables of maximal variance constructed from orthogonal linear combinations of the input features. Since this ensures only uncorrelatedness of the resulting features this is a weaker notion of statistical independence than for independent component analysis.

To generate the feature maps, a winner-takes-all strategy and a further nonlinear function can be applied on the result of the convolution. The statistical learning methods described above can be applied regardless of the nature of the combined winner-take-all and further nonlinearities.

At least one pooling step can be provided in which feature maps of a proceeding map are locally averaged and sub-sampled. The pooling step contributes to the invariance of the recognition under transformations of the different patterns corresponding to the same object.

The step of classifying can be effected using a one-layered sigmoidal function trained with a gradient descent technique. (Note that for pre-setting the statistically independent features no classical supervised learning process is necessary thus reducing substantially the effort needed for setting up the system). The step of classifying can alternatively be carried out using a radial basis function network, a nearest neighbor matching algorithm, or a multi-layer-perceptron network.

The steps of feature detection, optional pooling and combination can be repeated several times.

According to a further aspect of the present invention a method for recognizing a pattern having a set of features is proposed. A plurality of fixed feature detectors are convolved for the local window scanned over a representation of the pattern to generate a plurality of feature maps. Local combinations of features of the feature maps are sensed and the pattern is classified (and thus recognized) on the basis of the sensed local combinations. To generate the feature maps, a winner-takes-all strategy is applied on the result of the convolution.

According to a further aspect of the present invention a method for training a hierarchical network is proposed. The hierarchical network comprises means for convolving a plurality of fixed feature detectors with a local window scanned over a representation of the pattern to generate a plurality of feature maps, means for applying a nonlinear function to each feature map separately, intermediate means for sensing local combinations of simple features of the feature maps, and means for recognizing the pattern by classifying it on the basis of the sensed local combinations. According to the present invention the means for sensing local combinations are incrementally trained such that the statistical independence of the local combinations of features is enhanced.

According to a still further aspect of the present invention a computer software program implementing a method as set forth above when running on a computing device is proposed.

According to a still further aspect of the present invention a pattern recognition apparatus with a hierarchical network is proposed. The hierarchical network comprises means for inputting a representation of a pattern (i.e. a digital photo of an object). Furthermore means for convolving a plurality of fixed feature detectors with a local window scanned over a representation of the pattern to generate a plurality of feature maps are provided. Intermediate means sense local combinations of features of the feature maps. Classification means "recognize" the pattern on the basis of the sensed local combinations. The means for sensing local combinations are designed for a use of pre-set of statistically independent features.

According to a still further aspect of the present invention a pattern recognition apparatus with a hierarchical network is proposed, the hierarchical network comprising means for inputting a representation of a pattern. Furthermore means for convolving a plurality of fixed feature detectors with a local window scanned over a representation of the pattern are provided to generate a plurality of feature maps. Intermediate means sense local combinations of features of the feature maps. Finally the means for classifying recognize the pattern on the basis of sensed local combinations. The convolution means thereby are designed for a use of a winner-takes-all strategy to generate the feature map.

The classifying means can be tuned to a particular whole view of the pattern.

The hierarchical network can comprise pooling means for locally averaging and subsampling feature maps generated by the convolution means.

The classifying means can be designed to use a sigmoidal function trained with a gradient descent technique.

The classifying means can be designed to use a radial basis function network.

The classifying means can be based on a Nearest-Neighbor matching method.

The classifying means can be based on a Multi-Layer-Perceptron network.

The hierarchical network can be implemented by a parallel computation network.

It is important to note that the set of means for the first feature detection, the optional pooling and the combination layer can be provided several times in a concatenated manner.

According to a still further aspect of the present invention a pattern recognition apparatus as defined before can be used for optical recognition of characters or objects in particularly for the optical recognition of three dimensional objects.

DESCRIPTION OF THE DRAWINGS

Further features, objects and advantages of the present invention will become evident for the man skilled in the art when reading the following detailed explanation of an embodiment of the present invention taken in conjunction with the figures of the enclosed drawings.

DETAILED DESCRIPTION OF THE PREFERRED EMBODIMENTS

Figure 1:
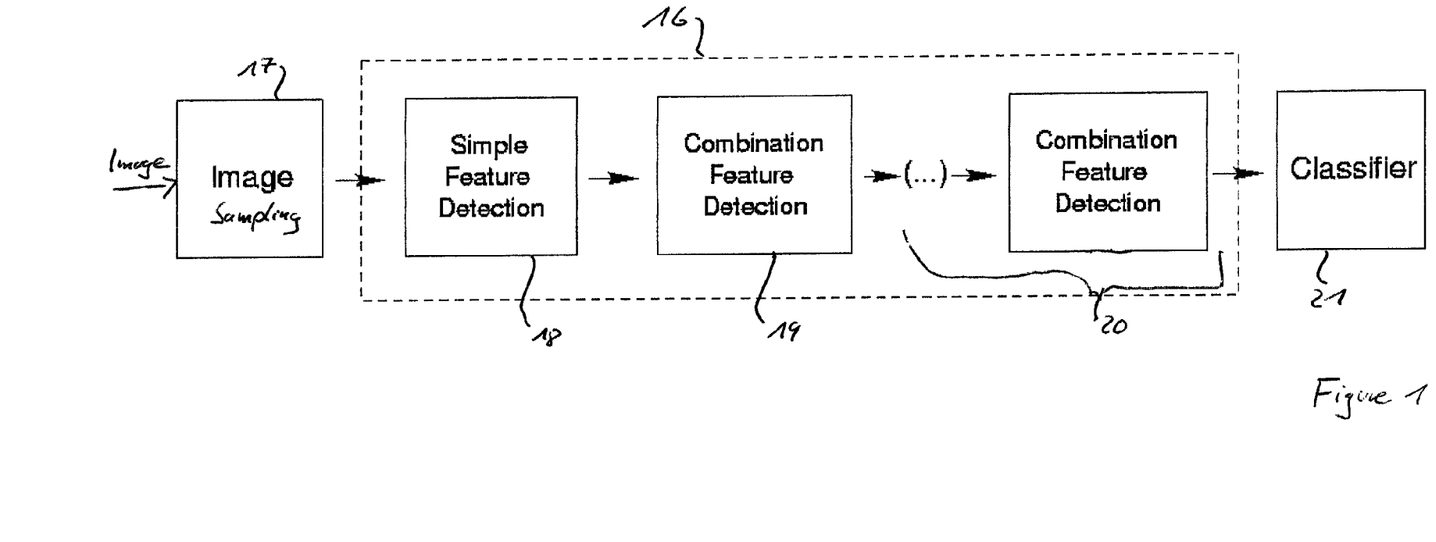
FIG. 1 explains the prestructuring of a network according to the present invention.

At first the prestructuring of a network according to the present invention will be shown with reference to FIG. 1 which furthermore serves to demonstrate the technical means to implement the present invention. Images are sampled by a sampling device 17, such as f.e. a digital video or photo camera and then supplied to the hierarchical network, generally referenced with 16. The hierarchical network 16 comprises at least one set comprising a simple feature detection stage 18 and a combination feature detection stage 19. These stages 18, 19 can be repeated several times within the network 18, as it is schematically referenced with 20. The final output of the network 18 is then supplied to classifying means 21 which recognize the sampled image by classifying it.

Apart from the new structure the present invention is also concerned with a new approach for training the hierarchical network, which training uses statistical means for (incrementally) learning new feature detection stages 19. The incremental learning is based on detecting increasingly statistically independent features in higher stages of the processing hierarchy. Since this learning is unsupervised, no teacher signal is necessary and the recognition architecture can be pre-structured for a certain recognition scenario. Only the final classification means 21 must be trained with supervised learning, which reduces significantly the effort for the adaptation to a recognition task.

Figure 2:
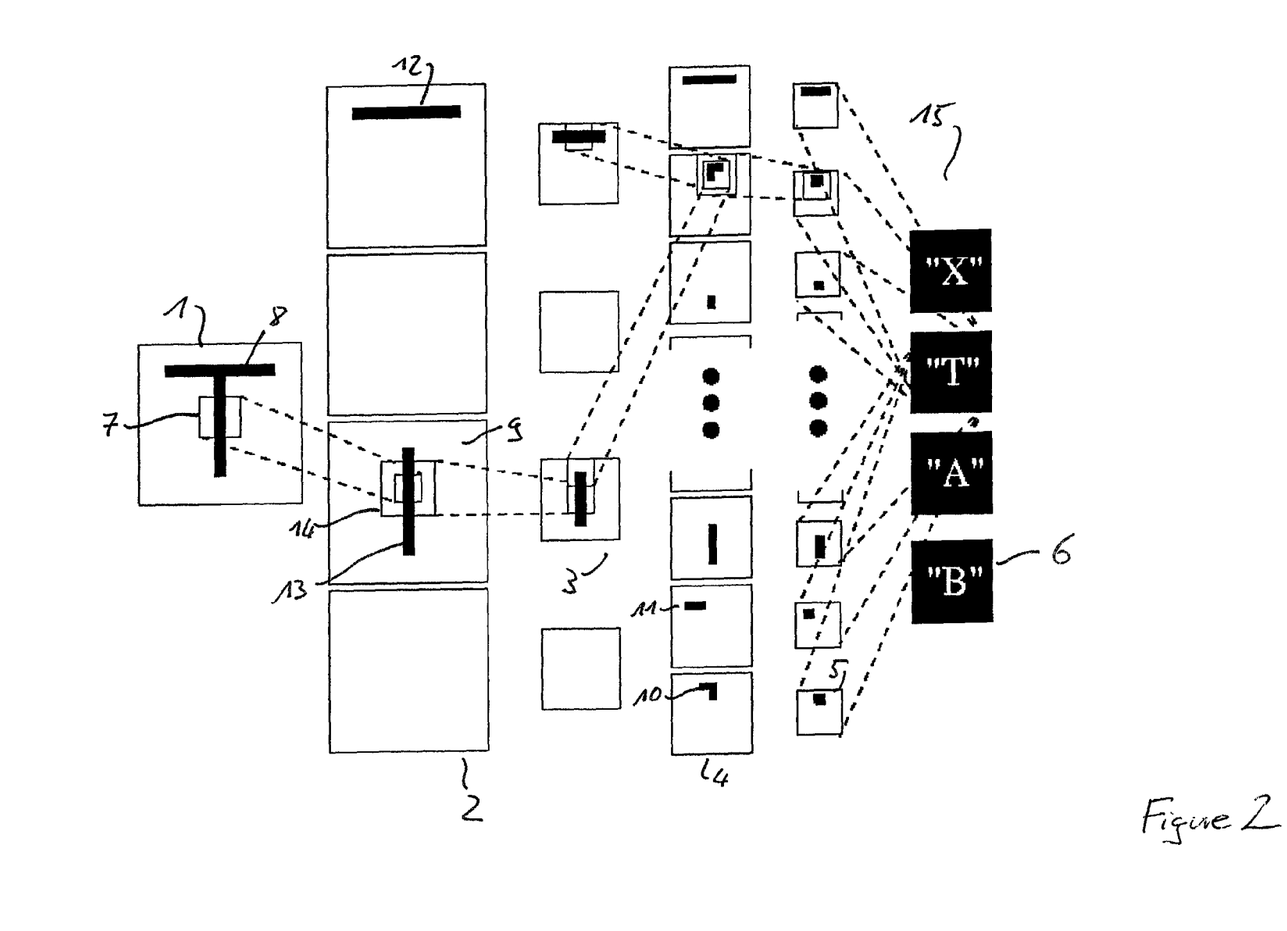
FIG. 2 shows schematically the architecture of a hierarchical network according to the present invention.

In the following the hierarchical model architecture according to the present invention will be explained in detailed with reference to FIG. 2. The model is based on a feed-forward architecture with weight-sharing and a succession of feature-sensitive matching stages 2 and pooling stages 3.

The model comprises three stages in the processing hierarchy. The first feature-matching stage 2 consists of an initial linear sign-insensitive receptive field summation, a Winner-Take-All mechanism between features at the same position and a final non-linear threshold function. In the following the notation will be adopted that vector indices run over the set of neurons within a particular plane of a particular layer. To compute the response $q_1^l(x,y)$ of a simple cell in the first layer 2, responsive to feature type l at position (x,y), first the image vector I is multiplied with a weight vector $w_1^l(x,y)$ characterizing the receptive field profile:

$$q_1^l(x,y) = |w_1^l(x,y) * I| \tag{1}$$

The inner product is denoted by *, i.e. for a 10×10 pixel image I and $w_1^l(x,y)$ are 100-dimensional vectors. The weights $w_1^l$ are normalized and characterize a localized receptive field in the visual field input layer. All cells in a feature plane l have the same receptive field structure, given by $w_1^l(x,y)$, but shifted receptive field centers, like in a classical weight-sharing or convolutional architecture (Fukushima, K. (1980), "Neocognitron: A self-organizing neural network model for a mechanism of pattern recognition unaffected by shift in position", Biol. Cyb., 39, 139-202; LeCun, Y., Bottou, L., Bengio, Y., & Haffner, P. (1998), "Gradient-based learning applied to document recognition", Proceedings of the IEEE, 86, 2278-2324).

In a second step a soft Winner-Take-All (WTA) mechanism is performed with $$r_1^l(x,y) = \begin{cases} 0 & \text{if } \frac{q_1^l(x,y)}{M} < \gamma_1 \text{ or } M = 0 \\ \frac{q_1^l(x,y) - M\gamma_1}{1 - \gamma_1} & \text{else,} \end{cases} \tag{2}$$

where $M = \max_k q_1^k(x,y)$ and $r_1^l(x,y)$ is the response after the WTA mechanism which suppresses sub-maximal responses. The parameter $0\gamma_1 < 1$ controls the strength of the competition. This nonlinearity is motivated as a model of latency-based competition that suppresses late responses through fast lateral inhibition.

The activity is then passed through a simple threshold function with a common threshold $\theta_1$ for all cells in the first layer 2:

$$s_1^l(x,y) = H(r_1^l(x,y) - \theta_1) \tag{3}$$

Where $H(x) = 1$ if $x \geq 0$ and $H(x) = 0$ else and $s_1^l(x,y)$ is the final activity of the neuron sensitive to feature l at position (x,y) in the first layer 2.

The activities of the layer 3 of pooling cells are given by $$c_1^l(x,y) = \tan h(g_1(x,y) * s_1^l) \tag{4}$$

where $g_1(x,y)$ is a normalized Gaussian localized spatial pooling kernel, with a width characterized by $\sigma_1$, which is identical for all features l, and tan h is the hyperbolic tangent sigmoid transfer function. The optional pooling layer 3 contributes to the invariance of the recognition under transformations of the different patterns corresponding to the same object.

The features in the intermediate layer 4 are sensitive to local combinations 10, 11 of the features 12, 13 in the planes of the previous layer 3 (or 2 in case no pooling layer is provided), and are thus called combination cells in the following. The combined linear summation over previous planes is given by:

$$q_2^l(x, y) = \left| \sum_k w_2^{lk}(x, y) * c_1^k \right| \quad (5)$$

where $w_2^{lk}(x,y)$ is the receptive field vector of the pooling cell of feature l at position (x,y) describing connections to the plane k of the cells of the previous pooling layer 3.

After the same WTA procedure with a strength parameter $\gamma_2$, the activity in the pooling layer 3 is given after the application of a threshold function with a common threshold $\theta_2$:

$$s_2^l(x,y) = H(r_2^l(x,y) - \theta_2) \quad (6)$$

The step from the intermediate combination layer 4 to the second pooling layer 5 is identical to equation (4) and given by $$c_2^l(x,y) = \tan h(g_2(x,y) * s_2^l) \quad (7)$$

with a second Gaussian spatial pooling kernel, characterized by $g_2(x,y)$ with range $\sigma_2$.

In the final layer 15 neurons are sensitive to a whole view of a presented object, like the view-tuned-units (VTUs) 6 of Riesenhuber, M. & Poggio, T. (1999), "Are cortical models rally bound by the "binding problem" "?, Neuron, 24, 87-93), which are of radial-basis function type. To facilitate gradient-based learning, however, again a sigmoid nonlinearity of the form:

$$s_3^l = \varnothing\left( \sum_k w_3^{lk} * c_2^k - \theta_3^l \right) \quad (8)$$

is chosen, where $\varnothing(x) = 1 + \exp(-\beta x))^{-1}$ is a sigmoid Fermi transfer function and $w_3^{lk}$ is the connection vector of a single view-tuned cell, indexed by l, to the previous whole plane k in the previous layer. To allow for a greater flexibility in response, every cell 6 has its own threshold $\theta_3^l$. Each VTU cell 6 represents a particular view of an object, therefore classification of an unknown input stimulus is done by taking the maximally active VTU 6 in the final layer 15. If this activation does not exceed a certain threshold, the pattern may be rejected as unknown or clutter.

It is important to note that the set of layers consisting of the first feature detection layer 3, the optional pooling layer 3 and the combination layer 4 can be provided several times.

Now the training of a hierarchical network according to the present invention will be explained. The training can be effected by feeding the network with training patterns. According to an example the library of training patterns consists of 100 objects taken at 72 views with successive 5° rotations.

The starting point is an appropriate adjustment of pooling ranges $\sigma_1$, $\sigma_2$, thresholds $\theta_1$, $\theta_2$, and strengths $\gamma_1$, $\gamma_2$ of the WTA competition. These parameters characterize the overall quality of the network nonlinearities. In a second step then the parameters of the nonlinearities are kept constant and the weight structure of the intermediate and final layers in the hierarchy are modified. According to an example the evaluation is based on a classification task of the 100 objects of the known COIL-100 database (Nayar, S. K., Nene, S. A., & Murase, H. (1996), "Real-time 100 object recognition system", in Proc. Of ARPA Image Understanding Workshop, Palm Springs). First a simple paradigm for the training of the view-tuned units was followed, which is similar to the RBF-type setting of Riesenhuber & Poggio.

For each of the 100 objects there are 72 views available, which are taken at subsequent rotations of 5°. Three views at angles 0°, 120°, and 240° are taken as a training pattern (view) for each object and a view-tuned cell for each view is adopted, giving a total of 300 VTUs. For a particular parameter setting, the activation of the final layer 15 is recorded. This activity vector is used for nearest-neighbor classification in the high-dimensional space. This can be considered as template matching in the space that is spanned by the neural activities in the final layer 15. Training simply amounts to storing a template for each training view.

Departing from the work of Riesenhuber & Poggio, first a connection pattern for the cells of the combination layer 4 is considered, which is based on connecting only two neurons of the pooling layer 3 in the local neighborhood of the four adjacent neurons of the receptive field center of the cell of the combination (intermediate) layer 4 within the pooling layer 3. After leaving out symmetric permutations and configurations, where the two pooling neurons are in different orientation planes and occupy the same receptive field position, 120 different pairwise combination cell types are obtained for the combination layer 4. In an exhaustive grid-like search over parameter combinations for a fixed number of 3 VTUs per object, an optimal setting for the classification performance can be found. The resulting parameters are $\theta_1 = 0.1$, $\theta_2 = 0.95$, $\sigma_1 = 2.5$, $\sigma_2 = 2.5$, $\gamma_1 = 0.9$ and $\gamma_2 = 0$.

The resulting nearest-neighbor classification is 69% correct. This particular parameter setting implies a certain coding strategy: The first layer 2 of simple edge detectors 12, 13 combines a rather low threshold with a strong local competition between orientations. The result is a kind of "segmentation" of the input into one of the four different orientation categories. These features are pooled within a range that is comparable to the size of the Gabor receptive fields (layer 2). The pairwise combination cells have a high threshold, which is only activated, if both presynaptic cells are strongly active. Since $\gamma_2 = 0$, a further WTA at the level of combination cells seems to be unnecessary, since the high threshold already causes strong sparsification.

Assuming that the coding strategy with low initial thresholds and strong WTA is optimal, one can generate an ensemble of activity vectors of the planes of the pooling layer 3 for the whole input image ensemble. One can then consider a random selection of 20000 5×5 patches from this ensemble. Since there are four planes in the pooling layer 3, this makes up a 5×5×4=100-dimensional activity vector. One can then both perform a principal (PCA) and independent (ICA) component analysis on this ensemble of local patches. The ICA can f.e. be performed using the FastICA algorithm (Hyvärinen, A. & Oja, E. (1997), "A fast fixed-point algorithm for independent component Analysis"; Neural Computation 9(7), 1483-1492). For both PCA and ICA alternatively 20 or 50 components can be considered which are then used as the weight vectors for the connections of the resulting 20 or 50 feature planes. After evaluating the performance of the resulting nearest-neighbor classifier, one can adjust the parameters of the following layers to $\sigma_1 = 1.5$, $\sigma_2=1.5$, $\theta_2=0.5$, $\gamma_2=0$, which reflects an adaptation to the more extended 5×5 receptive fields of the combination layer neurons. After the optimization based on nearest-neighbor classification the performance gain can be examined, which can be obtained by optimally tuning the response of the view-tuned-units with their sigmoidal transfer function. One can perform gradient-based supervised learning on the classifier output of the final layer neurons. Here, the target output for a particular view i in the training set was given by $\bar{s}_3^l(i)=0.9$, where l is the index of the VTU 6 which is closest to the view presented, and $\bar{s}_3^k(i)=0.3$ for the other views of the same object. All other VTUs 6 are expected to be silent at an activation level of $\bar{s}_3^{l'}(i)=0.1$. The training can be done by stochastic gradient descent (see LeCun, Y., Bottou, L., Bengio, Y., & Haffner, P. (1998), "Gradient-based learning applied to document recognition", Proceedings of the IEEE, 86, 2278-2324) on the quadratic energy function $E=\Sigma_i\Sigma_l(\bar{s}^{3l}(i)-s_3^l(I_i))^2$ where i counts over the training images.

Of particular interest in any invariant recognition approach is the ability of generalization to previously unseen object views. One of the main idea behind hierarchical architectures is to achieve a gradually increasing invariance of the neural activation in later stages, when certain transformations are applied to the object view. The present invention provides for a considerable invariance gained from the hierarchical architecture.

Now the Nearest-Neighbor Classification approach which can be performed by the VTUs 6 will be explained. Template matching using the nearest neighbor search with an Euclidean metric in the feature space representing the image is a straightforward approach to image classification. The simplest approach would then be to collect the training views like in a photographic memory and then use VTUs 6 which perform a nearest neighbor search for the whole image intensity vector. With increasing numbers of training vectors, the performance is clearly expected to increase. The main problem is the inefficient representation of the object representatives, which requires huge amounts of data for larger numbers of objects. As one can expect a higher degree of invariance from the hierarchical processing according to the present invention, the template matching can be based on the activation of the pooled combination cells in layer 5.

The classification rate exhibits a modest, almost linear increase with the number of available views, if a direct template matching on the image data is applied On the contrary, if one uses a nearest neighbor classifier based on the outputs of the layer 5 of the proposed hierarchy, a very rapid increase can be observed already for moderate numbers of training data, which then saturates towards perfect classification. Using the full set of 120 combination cells leads to a similar performance as using 50 cells with largest variance. Of particular interest is that ICA-based determination of the combination cells yields better results and outperforms the simple pairwise constructed combination cells.

In the following the tuning of View-Tuned Units 6 will be explained. The nearest-neighbor matching is a simple approach, which has the advantage of not requiring any additional adaptation of weights. The additional final layer 15, however, should be able to extract more information from the high-dimensional activation pattern in the previous pooling layer 5. To limit the number of available view-tuned units 6, one can use a setup where only three VTUs 6 are available for each object. The weights and thresholds of these VTUs 6 can be optimized by stochastic gradient descent. In spite of a small number of only three VTUs 6 the optimization achieves a comparable performance depending on the number of training patterns available. Here again the ICA optimized features give best results. The principal component analysis, which is a more general variance-based selection approach than choosing pairwise combination cells with maximum variance, outperforms the pairwise model, but does not reach the level of ICA.

A central problem for recognition is that any natural stimulus usually not only contains the object to be recognized isolated from a background, but also a strong amount of clutter. It is mainly the amount of clutter in the surround which limits the ability of increasing the pooling ranges to get greater translation tolerance for the recognition (see Mel, B. W. & Fiser, J. (2000), "Minimizing binding errors using learned conjunctive features", Neural computation 12(4), 731-762).

The influence of clutter is evaluated by artificially generating a random cluttered background, by cutting out the object images and placing them on a changing cluttered background image with a random position variance of four pixels. With this procedure an image ensemble for the set of 20 objects is generated from the COIL-20 database and performed both training and testing with these images. The ensemble was enlarged by 200 views containing only clutter, for which all VTUs 6 are expected to remain silent (i.e. their training output was set to 0.1). Setting a rejection threshold of 0.2 for the final VTUs, only 1% of the clutter images are wrongly classified as objects. The wrong rejection rate, i.e. when a presented object does not exceed threshold activation is less than 1%. The overall classification rate, using three VTUs per object is comparable to the larger COIL-100 set. This highlights the capability of the hierarchical network to generalize over different surroundings, without a necessity for prior segmentation. Even with only three training views, an 85% correct classification can be achieved.

To, summarize, there is an ongoing debate over the capabilities of hierarchical neural feed-forward architectures for performing real-world 3D invariant object recognition. Although a variety of hierarchical models exists, appropriate supervised and unsupervised learning methods are still an issue of intense research. A feed-forward model for recognition is proposed that shares components like weight-sharing, pooling stages, and Winner-Take-All nonlinearities with earlier approaches, but focus on new methods for determining optimal feature-detecting cells in intermediate stages of the hierarchical network. The independent component analysis (ICA), which was previously mostly applied to the initial feature detection stages, yields superior results for the recognition performance also for intermediate complex features. Features learned by ICA lead to better results than earlier proposed heuristically chosen combinations of simple features.

Due to the improved learning efficiency according to one embodiment of the present invention, not only two dimensionally objects, but also three dimensional objects with variations of three dimensional rotation, size and lightning conditions can be recognized. As another advantage this learning method is viable for arbitrary nonlinearities between stages in the hierarchical convolutional networks, like e.g. non-differentiable Winner-Take-All nonlinearities. In contrast thereto the technology according to the above-mentioned prior art can only perform backpropagation learning for differentiable nonlinearities which poses certain restrictions on the network design.

The invention claimed is:

1. A method for recognizing a pattern having a set of features, said pattern is an unknown pattern, the method comprising the following steps:

receiving essentially statistically independent features that are pre-set for a local combination of features;

convolving a plurality of fixed feature detectors with a local window scanned over a representation of the pattern to generate a plurality of feature maps;

applying a nonlinearity function to each feature map separately;

sensing, in a feature in the pattern to be recognized, the presence of pre-set local combinations of at least one simple feature of the feature maps; and recognizing the pattern by classifying it on the basis of the sensed local combinations, wherein said essentially statistically independent features are pre-set for the local combination of features.

2. The method of claim 1, wherein the statistically independent features are pre-determined by means of an independent component analysis of convolutions of training patterns.

3. The method of claim 1, wherein the statistically independent features are pre-determined by means of a principal component analysis of convolutions of training patterns.

4. The method of claim 1, wherein a winner-takes-all strategy is applied on the result of the convolution to generate the feature maps.

5. The method of claim 1, wherein said nonlinearity function applied to each feature map is an arbitrary, a non-differentiable nonlinearity function.

6. The method of claim 1, further comprising the step of:
pooling the feature maps wherein the feature maps of a preceding step are locally averaged and subsampled.

7. The method of claim 1, wherein the recognizing step uses a 1-layered sigmoidal function trained with a gradient descent technique to classify the pattern.

8. The method of claim 1, wherein classifying the pattern in the recognizing step uses one of a radial basis function network, a nearest neighbor matching algorithm, and a multi-layer-perceptron network.

9. The method of claim 1, wherein said convolving step and said generating step are repeated.

10. A computer-readable medium embodied with a computer software program, capable of operating on a computing device that implements a method according to claim 1 when executed on the computing device.

11. A pattern recognition apparatus with a hierarchical network, the hierarchical network comprising:

means for receiving essentially statistically independent features that are pre-set for a local combination of features;

means for inputting a representation of a pattern, wherein said pattern is an unknown pattern;

means for convolving a plurality of fixed feature detectors with a local window scanned over the representation of the pattern to generate a plurality of feature maps;

means for applying a nonlinearity function to each feature map separately;

intermediate means for sensing local combinations of simple features of the feature maps; and means for recognizing the pattern by classifying it on the basis of the sensed local combinations;

wherein said intermediate means utilize said pre-set essentially statistically independent features.

12. The apparatus of claim 11 wherein the statistically independent features are pre-set by means of an independent component analysis of training patterns.

13. The apparatus of claim 11, wherein the statistically independent features are pre-set by a principal component analysis of training patterns.

14. The apparatus of claim 11, wherein the means for convolving generates the feature maps applies a winner-takes-all strategy to the result of the convolution.

15. The apparatus of claim 11, the means for applying a nonlinearity function applies an arbitrary, non-differentiable nonlinearity function to each feature map.

16. The apparatus of claim 11, further comprising:
pooling means for locally averaging and subsampling feature maps generated by the convolution means.

17. The apparatus of claim 11, wherein the recognizing means are designed to use a sigmoidal function trained with a gradient descent technique to classify the pattern.

18. The apparatus of claim 11, wherein the recognizing means are designed to use one of a radial basis function network, a nearest neighbor matching algorithm, and a multi-layer-perceptron network to classify the pattern.

19. The apparatus of claim 11, wherein the hierarchical network is implemented by means of a parallel computation network.

20. The apparatus of claim 11, for use in optically recognizing at least one of characters and objects in digital representations.

21. The apparatus of claim 11, for use in optically recognizing at least one of handwritten digits and characters.

22. The apparatus of claim 11, wherein the recognizing means are tuned to a particular whole view of the pattern.

* * * * *